United States Patent

Hanna

[11] Patent Number: 6,108,512
[45] Date of Patent: Aug. 22, 2000

[54] COPY PREVENTION METHOD

[75] Inventor: Thomas A. Hanna, South Pasadena, Calif.

[73] Assignee: Xerox Corporation, Stamford, Conn.

[21] Appl. No.: 09/450,817

[22] Filed: Nov. 29, 1999

[51] Int. Cl.[7] .................................................. G03G 21/04
[52] U.S. Cl. .............................. 399/366; 283/902; 380/3; 355/133
[58] Field of Search ........................... 399/366; 283/902; 380/3, 51, 54, 55; 355/133

[56] References Cited

U.S. PATENT DOCUMENTS 5,087,507  2/1992  Heinzer .................................... 428/195

Primary Examiner—Richard Moses
Attorney, Agent, or Firm—Robert Cunha

[57] ABSTRACT

A system for producing non-copyable prints. In a xerographic printer, text is printed using clear toner. Thus, the only optical difference between toner and non-toner portions of the page is in the reflectivity. The plastic toner will reflect more light than the paper. A human reader can now read the image by holding the page at such an angle that the eye will intercept the reflected light from the toner, producing a contrast between the lighter appearing toner and the darker appearing paper. However, a copier scanner is always set up to avoid reflected light, by supplying light at an oblique angle and reading at a right angle. In this case the diffused light is approximately equal for both toned and untoned surfaces, the scanner will detect no difference and the copier will not be able to copy the original.

2 Claims, 2 Drawing Sheets

COPY PREVENTION METHOD

BACKGROUND OF THE INVENTION

Preventing the copying of a document that can be read by a human reader. An image is printed using clear toner or ink, creating a difference in reflected light and diffused light that can be discerned by a human reader by holding the paper at an angle, but can not be detected by a copier scanner which is restricted to reading at right angles to the page.

There has been a need for a printer that can print a page that can be read but not copied. One method, described in U.S. Pat. Nos. 4,210,346 and 5,695,220, is to use a particular white toner and a particular white paper that are designed to have different diffused light characteristics at different angles. Of course, this system requires special, matched paper and toner. What is needed is a printer which produces a non-copyable print on whatever paper happens to be in the machine at the time.

SUMMARY OF THE INVENTION

This invention uses clear, ordinary toner or ink to which no pigment has been added. There are no special requirements for this toner or ink; the supplier is simply requested to supply the usual toner, but without any pigment. Since toner suppliers routinely supply toner with pigment parameters specified by the user, it would be a simple matter for the supplier to supply toner without pigment.

Similarly, the usual paper can also be used. A scanner, which reads diffused light, will not be able to detect any difference between a toned and untoned area because the diffused light from the paper will simply be transmitted through the clear toner. Thus, paper with a variety of color and texture can be used. However, there is a large difference in reflectance between the plastic toner and the fiber of the paper. Thus, if the human reader holds the paper at the correct angle, the amount of light coming off the toner is much greater than that from the paper, making the page clearly readable. Scanners are not and will not be designed to read at such an angle because if a scanner sees a large component of reflected white light it will misread all colors as being too light. Thus, scanners are built to avoid reflected light by having the illumination at an oblique angle and having the scanner read at a right angle to the paper.

DETAILED DESCRIPTION OF THE INVENTION

Figure 1:
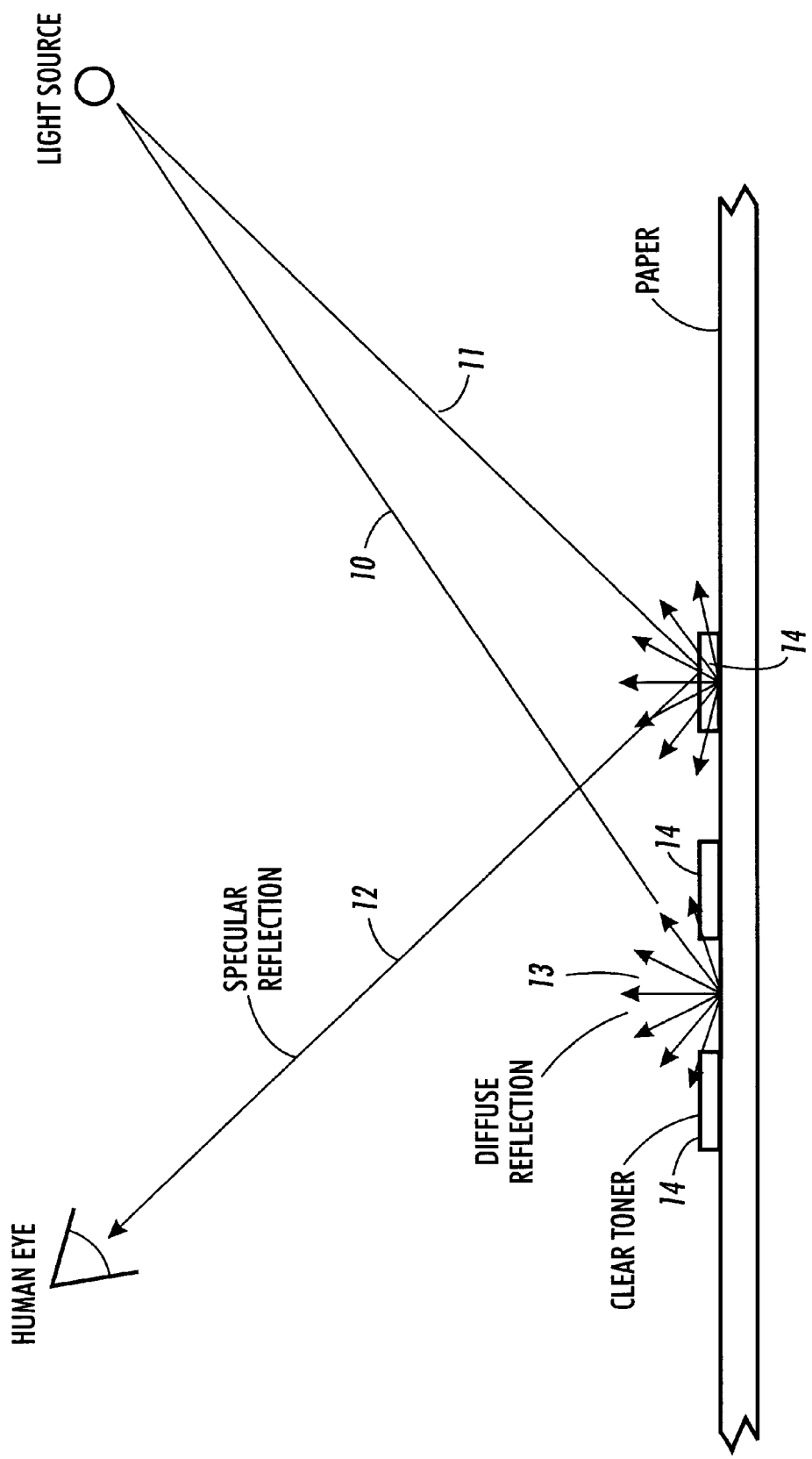
FIG. 1 shows how the human eye can detect a large difference between the toned and untoned portions of the page.

FIG. 1 shows how the human eye can read the page. Three clear toner areas 14 are shown. One ray of light 10 from the light source touches the paper at a point where there is no toner and the light 13 is diffused so that there is a small amount of light in all directions, including the direction toward the human eye. Another ray of light 11 of equal intensity touches the paper at a point where there is toner. Here there is a large amount of reflected light 12 in the indicated direction. If the human eye is positioned as shown, a large difference between toned and untoned areas is observed by the human.

Figure 2:
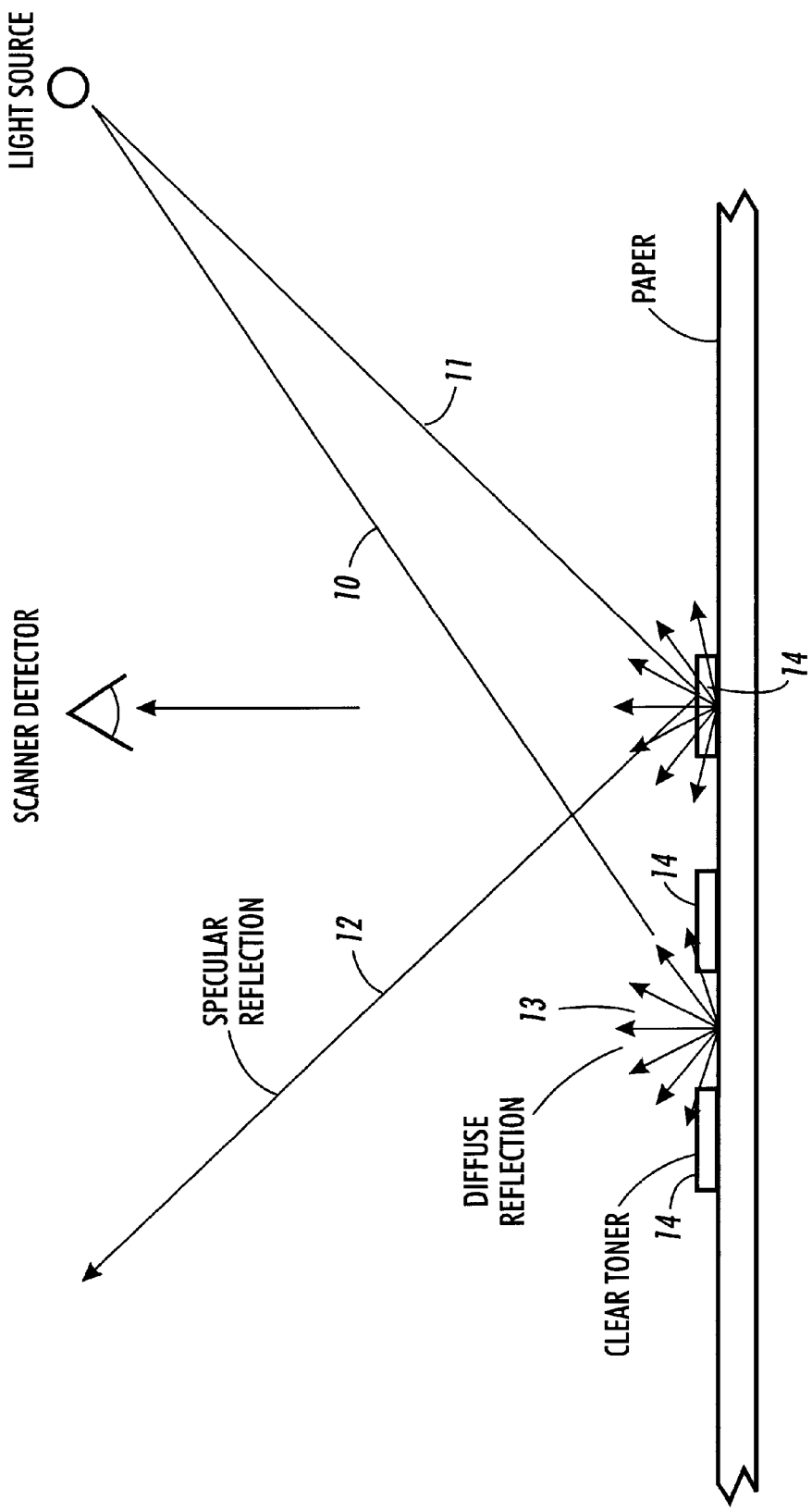
FIG. 2 shows how the scanner detector can not detect a difference between a toned and untoned area.

FIG. 2 is the arrangement of a typical scanner detector where the detector and light source are positioned to guarantee that the reflected light will not reach the detector. The arrangement is the same as that of FIG. 1 except that the scanner reads at right angles to the paper. In this case there is a small amount of diffused light coming from both the toned and untoned dots, and the scanner can not detect a difference.

More precisely, the amount of light diffused from a toned spot is slightly less than the light from an untoned spot, since for the toned spot, slightly more of the light is reflected, leaving slightly less to be diffused. In addition, the transparency of the toner may not be perfect. However, the resultant difference is still below the detection threshold of a copier scanner.

In a typical printer or copier, developer is a combination of three components, carrier, toner and pigment. The carrier can be made of a magnetic material such as copper zinc (Cu—Zn) or ferrite (Mn—Mg), and would typically be in the form of 35 to 50 micron beads. The toner, or binder, would be a plastic such as polyester, with a particle size of approximately seven to eight microns. Of course, for this application, the pigment would be left out.

Some xerographic machines use toner without a carrier. Here too, the same toner, again without pigment, can be used.

In all of these cases, the clear layer can be used for text on the entire page or only for text on a portion of the page that must not be copied.

The toner can be used in either "write white" or "write black" systems.

Assuming a black and white xerographic printer, a write white system will not put toner on a spot on the photoreceptor that has been illuminated by the laser, so the spot that has been written will be white. Similarly, a write black system will put toner on a spot on the photoreceptor that has been illuminated by the laser, so the spot that has been written will be black.

This system would usually be used with text, but it can also be used for pictures. In this case, to generate a "positive" image for the human reader, toner should be deposited where a light color is called for and no toner is used to show a dark area. The opposite would be used for generating a negative image.

A convenient way to use this invention would be in a "highlight" color printer, which typically prints in black and one highlight color. In this case, normal black/white pages could be printed using black toner, and non-copyable prints could be printed using clear toner for the highlight separation.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A xerographic printing system for printing pages that can not be copied comprising:

a photoreceptor, means for charging the photoreceptor, means for using an image to partially discharge the photoreceptor, means for applying a charged clear toner onto the photoreceptor to form a toner image on the photoreceptor, and means for transferring the toner to a paper to form an image that is not copyable by a copier having a scanner detector which is arranged so that reflected light from the paper is not detected by the detector.

2. The system of claim 1 wherein the toner is a polyester.

* * * * *